No. 693,013. Patented Feb. 11, 1902.
F. B. HERZOG.
ELECTRIC SIGNALING APPARATUS.
(Application filed Apr. 8, 1889.)
(No Model.)
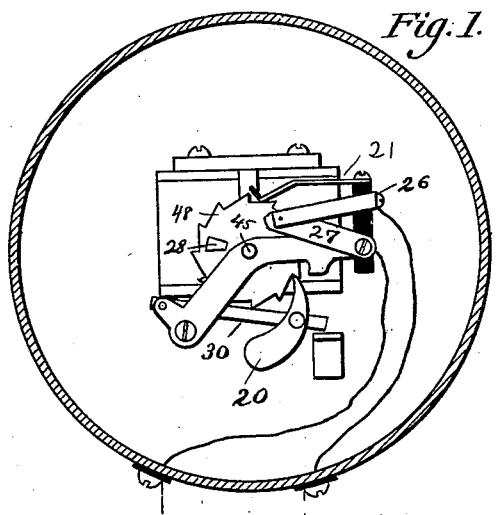
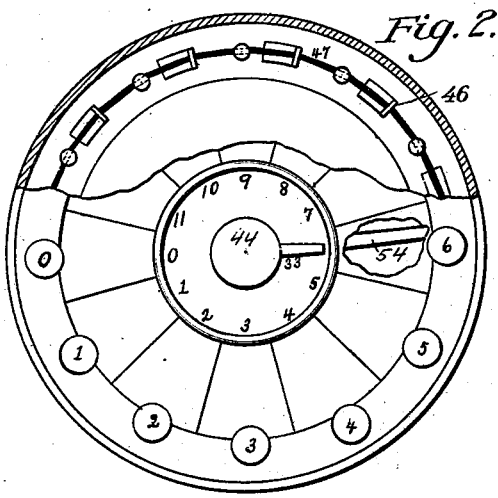
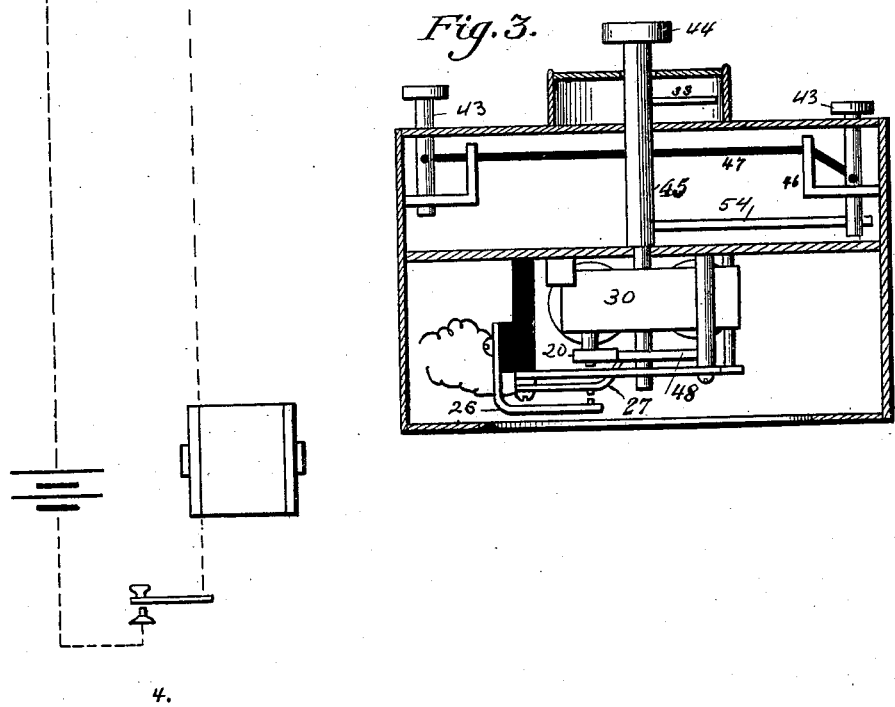
WITNESSES:
Edw. Raffin.
Chas. B. Young.
INVENTOR
F. Benedict Herzog.

UNITED STATES PATENT OFFICE.

FELIX BENEDICT HERZOG, OF NEW YORK, N. Y.

ELECTRIC SIGNALING APPARATUS.

SPECIFICATION forming part of Letters Patent No. 693,013, dated February 11, 1902.

Application filed April 8, 1889. Serial No. 306,474. (No model.)

*To all whom it may concern:*

Be it known that I, FELIX BENEDICT HERZOG, Ph. D., a citizen of the United States, and a resident of the city, county, and State of New York, have invented a new and useful Improvement in Electric Signaling Apparatus, Circuits, and Methods, of which the following is a specification.

My invention relates generally to the details of circuit-controllers, and especially to such as are used for automatic signal transmission.

In the drawings, Figure 1 shows the rear view; Fig. 2, a front view with part of the front plate broken away; Fig. 3, an elevation, partly in section, of the transmitter embodying my invention; 4 of Fig. 1, a diagram of the distant-station apparatus.

Referring to the figures in detail, a magnet is suitably supported and controls an armature 30, and by means of click 20 and pawl 21 it drives ratchet-wheel 48 step by step. This wheel has at least as many teeth as there are indications on a coöperating dial, and it is mounted on a spindle 45. When the apparatus is to be "set" to transmit a desired indication, this spindle is rotated manually by knob 44, and it carries along pointer 33 and extension 54. On the face of the wheel is a hole 28, into which can fall the bent end of spring 27 when the pointer 33 is at the zero-point. When the wheel is carried along by the spindle when this is turned for the purpose of setting the transmitter, the end of spring 27 is forced out of the hole in the wheel and the spring is forced up until it closes the circuit by contacting the spring 26, and the circuit thus closed remains closed until it is reopened by the step-by-step control of the magnet. The receiving apparatus 4 is of a simple type, here shown simply as a key and a magnet supposed to operate a bell, sounder, recorder, &c. At any time after the transmitter has been set if the key is tapped a number of times the transmitter will be driven a number of times, the number being controlled by the distance at starting between the position of the pointer and the zero position, in which the current will be finally broken, because the springs 27 26 are no longer forced together. When this happens, it will be noted at the receiving-station by the failure of the magnet to respond, and from the number of taps given prior to this the operator will be able to deduce the position of the transmitter at starting. The operation of the springs 26 27 may easily be made very positive, and I consider it an important improvement.

It is often desirable to substitute a more positive act for the careful setting of the transmitter-pointer. To effect this, I have devised the following: The pointer or an equivalent projection underneath the dial (as extension 54) is so placed that when rotated it will be obstructed by one of the pins 43, (placed at all or only at some of the desired indications on the dial.) These pins are normally out of the path of 54; but when depressed they are in its path. To set the transmitter, the operator pushes the selected button and then turns the spindle as far as he can. It will be stopped by the engagement of 54 and the depressed button. This may be done in the dark, if desired, and at all times is simpler than the careful rotation of the pointer. If the apparatus is of a type in which the wheel turns back after the control from the distant station has begun, (as, *e. g.*, in my Patent No. 289,834,) then no further provision is required; but for the apparatus shown herein provision must be made to withdraw the pin, so that when the magnet drives the wheel it may continue its rotation in the same direction. This is done as follows, it being observed that this device also makes it impossible to depress more than one button or pin at a time. One of the buttons is used as a zero or restoring button. Through the pin of that button, as well as of all of the others, passes a cord 47. Between each two of the shanks rises a bracket 46, through which also the cord passes, and the cord is just slack enough to permit of one button being depressed. As soon as a second pin or button is depressed the slack will be taken up at that point and the last button depressed will be raised out of the path of 54.

Another improvement is to make an inner dial containing the pointer 33, and then on the outer face dials may be placed without danger of interfering with the necessarily small and usually delicate pointer.

I claim—

1. In a transmitter, circuit-terminals comprising two contact-springs, combined with moving parts and a step-by-step wheel and acting when the transmitter is not set to keep the springs apart, and to keep them together while the apparatus is set.

2. A transmitter comprising a number of separately-movable parts—as push-buttons—all coöperating in the variation of the signals; together with a single pair of contacts which coöperate with every one of the various signals; a magnet, and, controlled by this magnet, mechanism for closing the contacts at the beginning of the signal and permanently separating them at the end thereof, substantially as described.

3. In a transmitter, means for setting it to transmit one of a number of variable signals; circuit-controlling devices including a pair of contact - springs; means whereby the springs are kept in contact when the transmission begins; means whereby they are separated when the transmission ends; and means whereby the signal transmitted depends as to its differentiation from the various signals the apparatus is adapted to transmit upon the interval between the beginning of the transmission and the final separation of the contacts.

FELIX BENEDICT HERZOG.

Witnesses:
CHAS. E. ANDERSON,
ARTHUR WILLIAM HOPKINS.